Oct. 30, 1956　　　　L. E. GOVONI　　　　2,768,736
THERMOMETER COVERS
Filed Jan. 5, 1953

INVENTOR.
Laura E. Govoni
BY 2,768,736
Patented Oct. 30, 1956

2,768,736

THERMOMETER COVERS

Laura E. Govoni, Somerville, Mass.

Application January 5, 1953, Serial No. 329,540

2 Claims. (Cl. 206—16.5)

The present invention relates to an improvement in thermometer covers.

The use of thermometer covers is especially useful in clinical work both as a timesaver and as a safety measure where the temperatures of a great number of patients must be taken with only a few thermometers. A single thermometer may be used repeatedly without the need of timetaking sterilization after each use. Further the use of a thermometer cover aids in preventing the transmission of contagious diseases, and the danger of the patient being injured by the glass of broken thermometers.

It is an object of the present invention to provide a non-flexible thin thermometer cover which because of its non-flexibility helps prevent the breaking of the thermometer when in use.

It is further an object of the present invention to provide a thin non-flexible thermometer cover having at its open end means for readily aiding in placing the cover on, and removing it from a thermometer without the need of touching the cover near its closed end, thus maintaining the sterility of the cover end which is placed in the patient's mouth.

Further it is an object of the present invention to provide a thermometer cover of thin non-flexible material, preferably transparent or translucent, which is in substantial face to face contact with the walls of the thermometer, whereby heat will be readily transmitted through the cover to the thermometer.

These and other objects of the present invention will be further clarified when considered in connection with the accompanying drawings in which.

Figure 1:
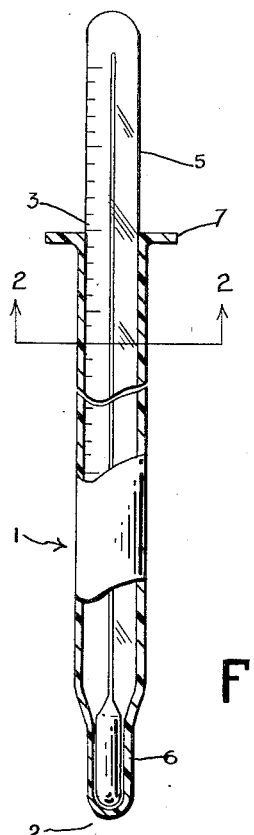
Fig. 1 is a sectional elevation of the cover on a thermometer.

As used in the present application the words tube or tubular when referring to the cover, mean a cover having a circular, triangular, square, oval, or other suitable cross section.

The thermometer cover in the present invention may be applied to thermometers of various designs, including rectal and oral thermometers of various shapes. As illustrated in the drawings, the invention has a hollow tube 1 of very thin relatively non-flexible material, closed at one end 2, and open at the other end 3. The cover should be made of a non-flexible material preferably a plastic such as styrene which may also have some degree of elasticity. If desired this material also may be transparent or translucent. Material, such as polyethylene, with less non-flexibility may also be used in a modification of the cover adapted to be used with thermometers of somewhat varying cross sectional shapes. However, material such as metal is undesirable.

Figure 2:
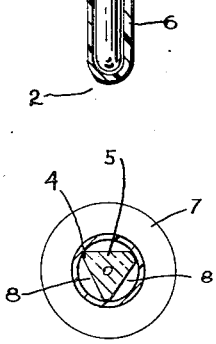
Fig. 2 is a cross section taken on line 2—2 of Figure 1.

The hollow center of the tube, preferably a cylinder, should have a cross sectional area which permits a snug fit around the corners 4 of the usual thermometer 5 as illustrated in Figure 2. For this purpose the cover may have some degree of flexibility or elasticity to permit it to be adapted for use with thermometers of somewhat different sizes and shapes. The lower section 6 of the hollow center should be narrower than the upper and is preferably cylindrical in shape conforming to the circular shape of the cross section of most mercury bulbs in thermometers. Since heat transmission to the mercury bulb is most essential for an accurate reading, this construction insures a maximum area of contact of the cover with bulbs of various types and thus the greatest possible heat transmission. If desired for heat transfer and greater sterility the space between the walls of the cover and thermometer may be filled with a mixture of alcohol and water or any suitable heat conductive medium which ordinarily will remain in place. Near or at the open end of the cover is positioned an outwardly extending flange 7 preferably of the same non-flexible material as the wall of the cover and continuous with it, or the top flange may be of material which will hug the walls of the thermometer such as polyethylene.

Thus when a sterilized cover is placed on a thermometer it may be held by the flange 7 and slipped over the end of the thermometer without the user touching the closed end of the cover and thereby avoiding contamination of it. When the cover is thus placed on the thermometer, the air at the bottom of the cover may escape along the openings 8 between the cover and the thermometer.

Figure 3:
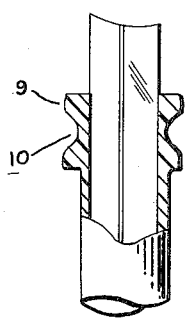
Fig. 3 is a fragmentary sectional elevation of a modification of the invention and Fig. 4 is a cross section of a modification of the invention.

A modification of the flange construction is illustrated in Figure 3 where the heavier open end 9 of the cover is provided with a shallow groove 10 which is easily gripped by the user.

Figure 4:
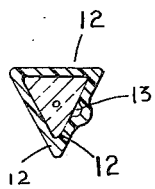

In Figure 4 a modification is illustrated in which the tube has wall members 12 substantially in face to face relation with the thermometer. A longitudinal groove 13 on the inside face of one of the wall members 12 from the top open edge to the narrowed lower part of the tube permits the passage of air to and from the bottom of the cover when it is put on or removed from a thermometer. Although these drawings illustrate a thermometer having a triangular cross section with a similarly shaped cover, adaptations may readily be made of a cover of this design for thermometers of other cross sectional shapes.

This cover should be sufficiently long to cover that part of the thermometer placed in the patient's mouth. It may if desired extend nearly to the top of the thermometer. If, however, it is sufficiently long enough to extend beyond the marks of the normal temperature range of individuals, the cover should be of a transparent material.

The wall of the cover should be as thin as possible to allow for rapid heating and heat transmission so that the thermometer may quickly reach its maximum temperature. The wall must be made thick enough, however, so that it may be pulled over the thermometer and pulled off the same without breaking the cover and so that it will withstand normal sterilization. It has been found that this cover should have substantial rigidity and that .020" of plastic material as set forth, such as polystyrene, has been satisfactory. For polyethylene the thickness should be slightly greater.

The cover may be put up in a sterile package, put on the thermometer and after it has been used it may be disposed of, or if desired the cover may be sterilized in boiling water or in any other suitable way.

It should be noted that the cover need not necessarily be non-flexible. This term is used relatively. The wall of the cover may be yielding but it should be sufficiently firm so that it will retain its tubular characteristic and so that it can be removed or put on the thermometer only by holding the cover at its flange at the open end. Polyethylene, styrene and other plastics may be adapted for this purpose.

Having now described my invention I claim:

1. In combination with a thermometer of the type described, a cover having thin continuous longitudinal wall members of non-flexible plastic material fitting in face to face relation with the walls of said thermometer, said wall members closed at their lower end around the lower end of said thermometer and having an open upper end closer to the top of the thermometer than to the bottom, there being a channel on the inside of at least one of said wall members and longitudinal thereto, and outwardly extending gripping means at the open end.

2. A tubular cover for thermometers of the type described, having a thin longitudinal wall member of non-flexible and non-porous material, said wall member closed at one end and open at the other, said wall member adapted to fit closely around a thermometer, and outwardly extending rigid flange means at the open end.

References Cited in the file of this patent

UNITED STATES PATENTS

| 1,898,654 | Breslauer | Feb. 21, 1933 |
| 2,651,203 | Lamb | Sept. 8, 1953 |

FOREIGN PATENTS

| 15,647 | Great Britain | Sept. 11, 1902 |